(12) United States Patent
Rannow et al.

(10) Patent No.: US 9,658,626 B2
(45) Date of Patent: May 23, 2017

(54) FAULT ISOLATION AND DECONTAMINATION PROCEDURES FOR ELECTROHYDRAULIC VALVES

(71) Applicant: Eaton Corporation, Cleveland, OH (US)

(72) Inventors: Michael Berne Rannow, Roseville, MN (US); Vishal Vijay Mahulkar, Eden Prairie, MN (US)

(73) Assignee: Eaton Corporation, Cleveland, OH (US)

( * ) Notice: Subject to any disclaimer, the term of this patent is extended or adjusted under 35 U.S.C. 154(b) by 546 days.

(21) Appl. No.: 14/138,386

(22) Filed: Dec. 23, 2013

(65) Prior Publication Data

US 2014/0174550 A1    Jun. 26, 2014

Related U.S. Application Data

(60) Provisional application No. 61/745,947, filed on Dec. 26, 2012.

(51) Int. Cl.
  *G05D 16/20*    (2006.01)
  *G05D 7/06*     (2006.01)
  *F15B 19/00*    (2006.01)

(52) U.S. Cl.
  CPC ......... *G05D 16/20* (2013.01); *F15B 19/005* (2013.01); *G05D 7/0617* (2013.01); *F15B 2211/8636* (2013.01); *Y10T 137/0379* (2015.04)

(58) Field of Classification Search
  CPC .......... F15B 19/005; F15B 20/008; F15B 2211/8636; F15B 2211/87; F15B 19/002;
  (Continued)

(56) References Cited

U.S. PATENT DOCUMENTS 5,299,420 A    4/1994  Devier et al.
5,751,606 A *  5/1998  Migachyov ......... F16K 37/0091
                                                  700/282
(Continued)

FOREIGN PATENT DOCUMENTS

CN      1462328 A      12/2003
EP    1 300 595 A2      4/2003
(Continued)

OTHER PUBLICATIONS

International Search Report and Written Opinion for PCT/US2013/077485 mailed Jun. 10, 2014.
(Continued)

*Primary Examiner* — F. Daniel Lopez
*Assistant Examiner* — Richard Drake
(74) *Attorney, Agent, or Firm* — Merchant & Gould P.C.

(57) ABSTRACT

A method for isolating a fault or blocked work port in an electro-hydraulic system is disclosed. In one step, a system pump is set to a first predetermined pressure and a valve assembly is commanded to a center position. In another step, the center position of the valve is recorded. In one step, the valve assembly is opened to place a work port associated with the valve in fluid communication with the pump, after which a first end position of the valve, a first work port pressure, and a first pump supply pressure are recorded. In another step, the valve assembly is opened to place the work port to a tank reservoir, after which a second end position of the valve and a fluid pressure associated with the work port are recorded. The recorded and measured data can then be analyzed to identify the fault condition or blocked work port.

11 Claims, 13 Drawing Sheets

(58) Field of Classification Search
CPC .. F16K 37/0083; F16K 37/0091; F16K 25/02; G05D 16/2066; G05D 16/20; G05D 7/0617
USPC .......................... 137/15.06; 701/41, 50, 29.7
See application file for complete search history.

(56) References Cited

U.S. PATENT DOCUMENTS

| | | | |
|---|---|---|---|
| 6,591,201 B1* | 7/2003 | Hyde | G01F 25/0007 700/281 |
| 6,860,284 B2* | 3/2005 | Wuerth | B60T 8/326 137/15.06 |
| 7,214,165 B2* | 5/2007 | Foster | F15B 21/041 137/15.06 |
| 8,352,129 B2 | 1/2013 | Yuan et al. | |
| 8,881,506 B2* | 11/2014 | Nakamura | F04B 49/08 417/364 |
| 9,163,387 B2 | 10/2015 | Yuan et al. | |
| 9,222,242 B2 | 12/2015 | Yuan et al. | |
| 2004/0085184 A1 | 5/2004 | Sigmund | |
| 2004/0186687 A1 | 9/2004 | Ogura et al. | |
| 2008/0053191 A1* | 3/2008 | Yoo | E02F 9/2221 73/1.72 |
| 2008/0312756 A1 | 12/2008 | Grichnik et al. | |
| 2009/0158624 A1 | 6/2009 | Hartwick | |
| 2009/0312852 A1* | 12/2009 | Yuan | F15B 13/0433 700/37 |
| 2010/0095835 A1 | 4/2010 | Yuan et al. | |
| 2011/0088785 A1 | 4/2011 | Balasubramanian | |
| 2011/0094595 A1 | 4/2011 | Schottler | |
| 2011/0126608 A1 | 6/2011 | Gehlhoff et al. | |
| 2012/0232756 A1* | 9/2012 | Yuan | E02F 9/226 701/41 |
| 2015/0323936 A1* | 11/2015 | Junk | G05D 7/0635 700/282 |

FOREIGN PATENT DOCUMENTS

| | | |
|---|---|---|
| GB | 2 419 429 A | 4/2006 |
| JP | 8-320726 | 12/1996 |
| JP | 2002-89516 | 3/2002 |
| WO | WO 2012/118564 A2 | 9/2012 |

OTHER PUBLICATIONS

Partial International Search Report for PCT/US2013/077485 mailed Apr. 11, 2014.
International Search Report and Written Opinion for Application No. PCT/US2012/000123 mailed Oct. 15, 2012.
Invitation to Pay Additional Fees with Partial International Search for Application No. PCT/US2012/000123 mailed Jun. 22, 2012.

* cited by examiner

FIG. 6

| Condition | Data Analysis Result | Action |
|---|---|---|
| 1 | 0 faults relative to Ps | continue isolation and/or recalibration procedure using Ps as reference |
| 2 | 1 fault relative to Ps | continue isolation and/or recalibration using Ps as reference |
| 3 | 2 faults relative to Ps, same service | continue isolation and/or recalibration using Ps as reference |
| 4 | 2 faults relative to Ps, different service | continue isolation and/or recalibration using Ps as reference if Ps = Pls + margin, else isolate/recalibrate pump controller instead of recalibrating valve system |
| 5 | 3 faults relative to Ps | continue isolation and/or recalibration using Pls+margin as reference if 3 faulted sensors agree with Pls (estimate margin from average of 3 faulted sensors), else isolate/recalibrate pump controller |
| 6 | 4 faults relative to Ps | continue isolation and/or recalibration using Pls+margin as reference if valve pressure sensors agree with Pls (estimate margin from average of 4 faulted sensors), else isolate/recalibrate pump controller. If standard deviation of 4 faulted sensors is clustered, then likely a Ps, Pls fault. |
| 7 | 1 fault, 2 calibrations relative to Ps | recalibrate Ps with 2 calibrations and good sensor and/or selected reference sensor; repeat reference sensor identification protocol at a different pressure |
| 8 | 1 fault, 3 calibrations relative to Ps | recalibrate Ps with 3 calibrations and/or selected reference sensor; repeat reference sensor identification protocol at a different pressure |
| 9 | 1 fault, 1 calibration relative to Ps, same service | continue isolation and/or recalibration using Ps as reference |
| 10 | 1 fault, 1 calibration relative to Ps, different service | continue isolation and/or recalibration using Ps as reference if Ps = Pls + margin, else isolate/recalibrate pump controller instead of recalibrating valve system |

| Condition | Data Analysis Result | Action |
|---|---|---|
| 11 | 2 faults on same service, 1 calibration relative to Ps | recalibrate Ps with 1 calibration and good sensor and/or selected reference sensor; repeat reference sensor identification protocol at a different pressure |
| 12 | 2 faults on different service, 1 calibration relative to Ps | recalibrate Ps with 1 calibration and good sensor and/or selected reference sensor; repeat reference sensor identification protocol at a different pressure |
| 13 | 2 faults, 2 calibrations relative to Ps | continue isolation and/or recalibration using Pfs+margin as reference if valve pressure sensors agree with Pfs (estimate margin from average of 4 faulted sensors), else isolate/recalibrate pump controller. If standard deviation of 4 faulted sensors is clustered, then likely a Ps, Pfs fault. |
| 14 | 3 faults, 1 calibration relative to Ps | continue isolation and/or recalibration using Pfs+margin as reference if 3 faulted sensors agree with Pfs (estimate margin from average of 3 faulted sensors), else isolate/recalibrate pump controller |
| 15 | 3 calibration relative to Ps | recalibrate Ps to lift head side or nearest calibration and/or selected reference sensor; repeat reference sensor identification protocol at a different pressure |
| 16 | 4 calibration relative to Ps | recalibrate Ps lift head side or nearest calibration and/or selected reference sensor; repeat reference sensor identification protocol at a different pressure |
| 17 | 1 calibration relative to Ps | recalibrate 1 sensor to Ps; repeat reference sensor identification protocol at a different pressure OR continue isolation and/or recalibration using Ps as reference |
| 18 | 2 calibrations relative to Ps, same service | recalibrate 2 sensors to Ps; repeat reference sensor identification protocol at a different pressure OR continue isolation and/or recalibration using Ps as reference |
| 19 | 2 calibrations relative to Ps, different service | recalibrate 2 sensors to Ps; repeat reference sensor identification protocol at a different pressure OR continue isolation and/or recalibration using Ps as reference |

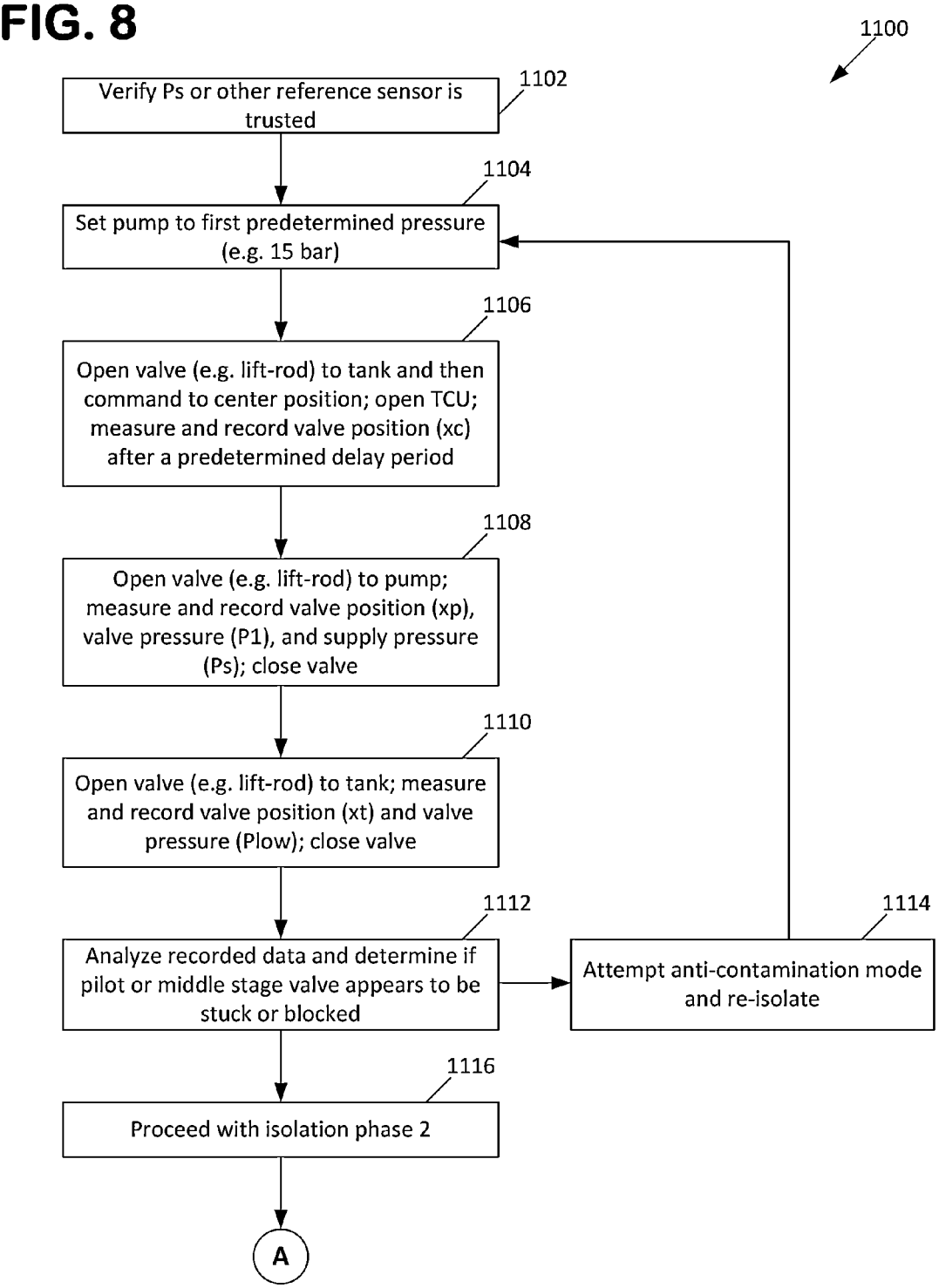

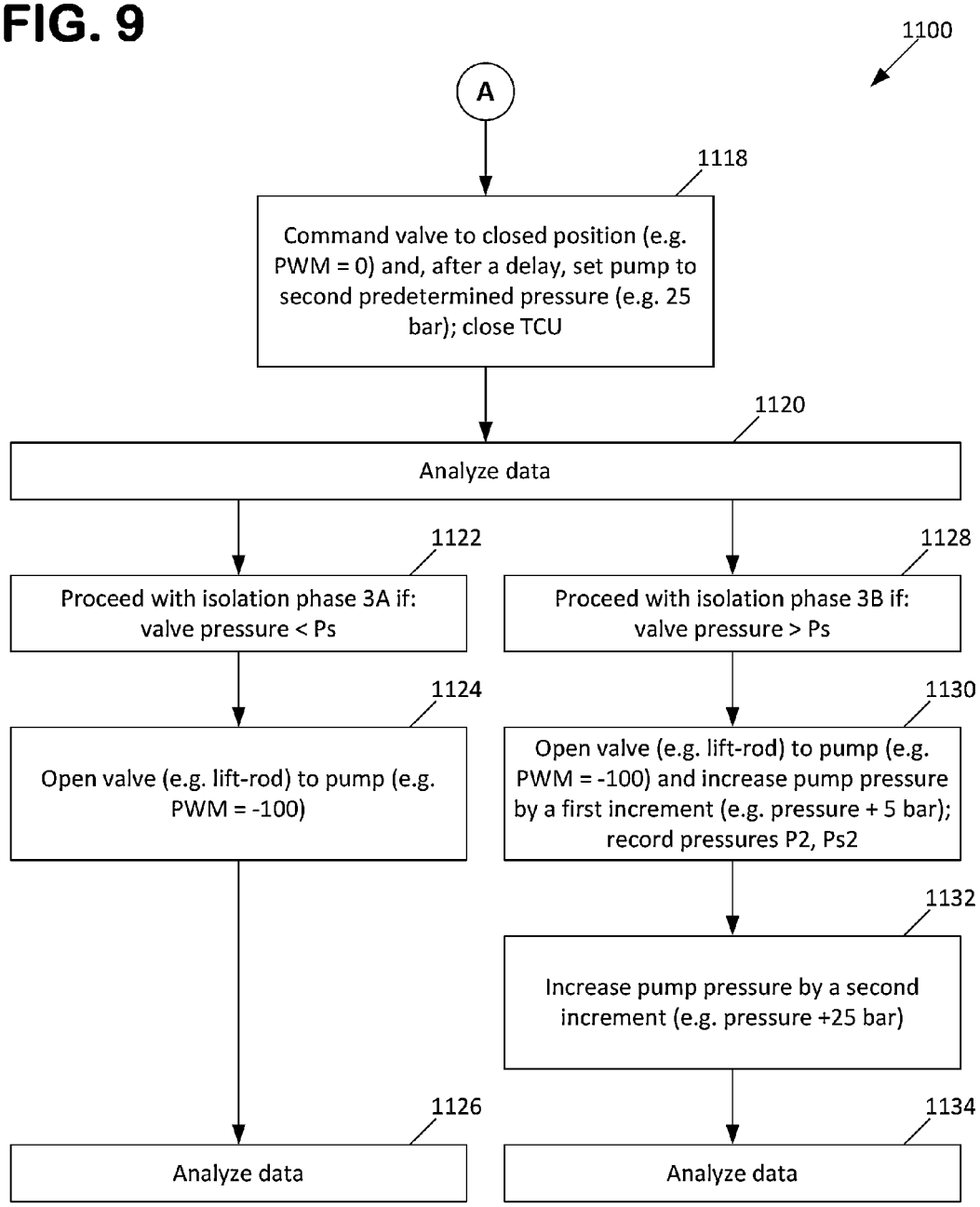

FIG. 10

| Phase | Data Analysis Result | Example | Diagnosis |
|---|---|---|---|
| 1 | Evaluation 1 | (recorded P1 != recorded Ps OR Plow != Pt[0]) AND at least one mismatch between recorded and stored xt,xc,xp, else go to phase 2 | pilot/middle stuck; OR blocked; OR pressure + LVDT fault – try anti-contamination mode and re-isolate |
| 1 | Evaluation 2 | recorded P1 != recorded Ps AND Plow = Pt(0) AND recorded xc = stored xc, but only one of recorded xt, xp equals stored value | pilot/middle blocked – try anti-contamination mode and re-isolate |
| 1 | Evaluation 3 | (at most only one of recorded xt,xc, and xp equals the stored value OR xc != stored xc) and xt, xc, xp equal each other | LVDT stuck – move on to next step |
| 1 | Evaluation 4 | (at most only one of recorded xt,xc, and xp equals the stored value OR xc != stored xc) and none of recorded xt,xc,xp equal each other | LVDT offset or gain fault – move on to next step |
| 2 | Evaluation 5 | P2 = Ps2 AND recorded P1 != Ps2 | meter-in valve or poppet or check valve stuck open |
| 2 | Evaluation 6 | P2 = Ps2 AND recorded P1 = Ps2 | Pressure sensor stuck |
| 2 | Evaluation 7 | P2 < Ps2 | No diagnosis – move on to phase 3A |
| 2 | Evaluation 8 | P2 > Ps2 | Pressure fault or MO stuck closed (load in air) – move on to phase 3B |
| 3a | Evaluation 9 | Pt > 0 OR Ps2-P2 > 0 | meter out valve or relief valve stuck open |
| 3a | Evaluation 10 | recorded P1 != recorded Ps AND P2 = Ps2 | meter out or meter in valve stuck closed OR no fault |
| 3a | Evaluation 11 | (P1 != Ps OR P2 != Ps2) AND P2 != recorded P1 | Pressure offset or gain fault |
| 3a | Evaluation 12 | (P1 != Ps OR P2 != Ps2) AND P2 = recorded P1 | pressure sensor stuck or large offset |
| 3b | Evaluation 13 | P3 = Ps AND recorded P2 = recorded Ps2 | MO stuck closed |
| 3b | Evaluation 14 | (P3 != Ps3 OR P2 != Ps2) AND P3 = recorded P2 | pressure sensor stuck |
| 3b | Evaluation 15 | (P3 != Ps3 OR P2 != Ps2) AND P3 != recorded P2 | pressure offset or gain fault |

1100a

FAULT ISOLATION AND DECONTAMINATION PROCEDURES FOR ELECTROHYDRAULIC VALVES

RELATED APPLICATIONS

This application claims priority to U.S. Provisional Patent Application Ser. No. 61/745,947, filed Dec. 26, 2012. The entirety of U.S. 61/745,947 is hereby incorporated by reference herein.

BACKGROUND

Work machines, such as fork lifts, wheel loaders, track loaders, excavators, backhoes, bull dozers, and telehandlers are known. Work machines can be used to move material, such as pallets, dirt, and/or debris. The work machines typically include a work implement (e.g., a fork) connected to the work machine. The work implements attached to the work machines are typically powered by a hydraulic system. The hydraulic system can include a hydraulic pump that is powered by a prime mover, such as a diesel engine. Work machines are commonly provided with electronic control systems that rely upon a number of inputs and outputs, for example, pressure sensors, position sensors, and valve actuators. In such electro-hydraulic systems, the added reliance on such components has led to the increased prevalence of system faults. These systems rely on the accuracy of the sensors to achieve accurate flow control and other system functions and control performance can be compromised when the sensors are inaccurate. Although many such faults can be detected, the faults are often difficult to identify or isolate due to the complex nature of electro-hydraulic systems. As such, there is a continued desire to improve diagnostic measures with respect to fault isolation. Also, the execution of some fault isolation protocols can be dangerous if an actuator is not in a safe state, such as when a load is suspended above the ground by the work machine. Accordingly, it is sometimes desired to place the work machine in a safe state before running such diagnostics. Improvements are also desired with respect to identifying a blocked work port and freeing blockage once identified.

SUMMARY

A method for isolating a fault or blocked work port in an electro-hydraulic system is disclosed. In one step, a system pump is set to a first predetermined pressure and a valve assembly is commanded to a center position. In another step, the center position of the valve is recorded. In one step, the valve assembly is opened to place a work port associated with the valve in fluid communication with the pump, after which a first end position of the valve, a first work port pressure, and a first pump supply pressure are recorded. In another step, the valve assembly is opened to place the work port to a tank reservoir, after which a second end position of the valve and a fluid pressure associated with the work port are recorded. The recorded and measured data can then be analyzed to identify the fault condition or blocked work port.

A method for isolating a blocked work port in an electro-hydraulic system is also disclosed. One step involves configuring a first valve and a second valve associated with opposite sides of a actuator to switch between a flow control operational mode and a pressure control operational mode depending upon an operational state of the actuator, wherein only one of the valves is in a pressure control mode and only one of the valves is in a flow control mode at the same time. Another step involves commanding a first valve and a second valve associated with an actuator to move the actuator in a first direction to place the actuator in a passive state or an overrunning state. The method may also include comparing a design flow rate with a calculated flow rate for the valve in the flow control operational mode and comparing a system pressure set point with a measured work port pressure for the valve in the pressure control operational mode.

An anti-contamination method for a blocked work port in an electro-hydraulic system is also disclosed. The method may include providing a first valve assembly and a second valve assembly associated with opposite sides of an actuator via a first and second work port. The method may also include partially opening the first valve assembly and fully opening a second valve assembly associated with a second side of the actuator to place the second work port in fluid communication with a system pump. One step of the method can be ramping an output of the system pump up to a maximum output for a period of time and then closing the second valve assembly and ramping the output of the pump downward. These steps can be repeated until the work port associated with the second valve assembly is freed from blockage or until a command is received to stop the procedure.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

FIG. 6 is a table showing possible analytical results and corresponding actions resulting from the procedure shown in FIG. 5.

FIG. 7 is a continuation of the table shown in FIG. 6.

FIG. 8 is a process flow chart showing a procedure in which a fault can be isolated.

FIG. 9 is a continuation of the procedure shown in FIG. 8.

FIG. 10 is a chart showing possible analytical results and corresponding actions resulting from the procedure shown in FIGS. 8 and 9.

DETAILED DESCRIPTION

Figure 1:
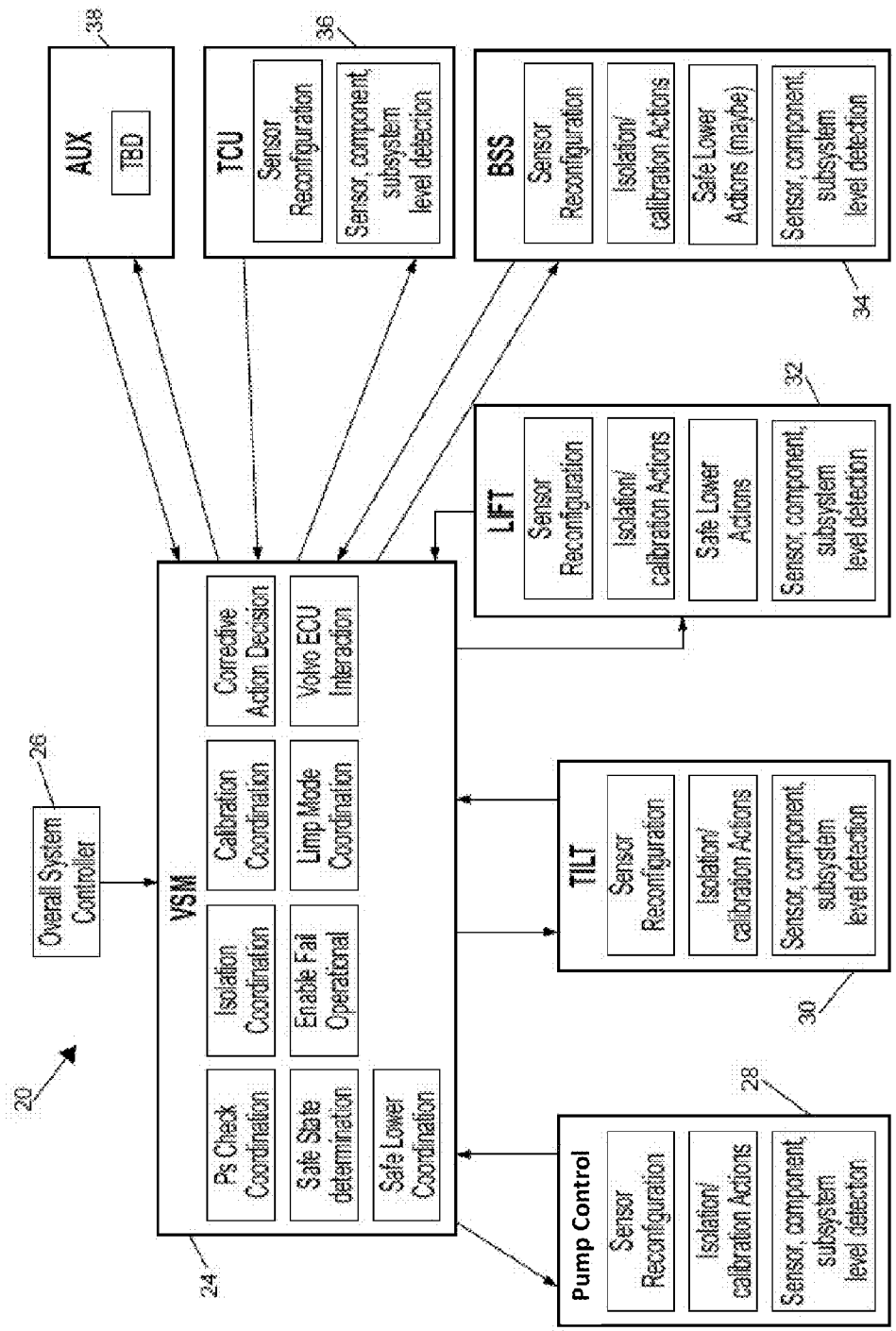
FIG. 1 is a schematic view of a control architecture having features that are examples of aspects in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

General Architecture Overview

The present disclosure relates generally to fault isolation schemes for use in hydraulic actuation systems. In certain embodiments, a control system architecture is used that is modularized and distributed. By using a modularized approach, the system can be reduced in complexity and can provide enhanced flexibility. By using a distributed architecture with overlapping and redundant fault detection strategies, fault isolation is enhanced. The controllers included in the system include a process and a non-transient storage medium or memory, such as RAM, flash drive or a hard drive. The memory is for storing executable code, the operating parameters, and the input from the operator interface while the processor is for executing the code.

FIG. 1 illustrates an example fault detection, isolation and reconfiguration (FDIR) architecture 20 in accordance with the principles of the present disclosure. The FDIR architecture 20, which may also be referred to as a control system 20, is adapted to provide control of a hydraulic actuation system of a vehicle such as a construction vehicle. In one example embodiment, the FDIR architecture 20 can be used to control a hydraulic actuation system of a work machine or wheel loader 22 (see FIG. 2). The FDIR architecture 20 includes a supervisory controller 24 adapted to interface with a main controller 26 of the wheel loader 22. The supervisory controller 24 is at a supervisory control level of the hydraulic actuation system. For example, the supervisory controller 24 supervises and interfaces with a plurality of control nodes (e.g. control modules, control subsystems, etc.) that are at a node level of the FDIR architecture 20. The FDIR architecture 20 is configured such that all of the nodes report back through the supervisory controller 24. In certain embodiments, there is no direct cross communication between the nodes. Instead, the nodes interface vertically with the supervisory controller 24, which functions to coordinate operation of the various nodes. As shown at FIG. 1, the nodes can include a pump control node 28, a tilt cylinder control node 30, a lift cylinder control node 32, a boom suspension system control node 34, a tank control unit node 36 and one or more additional auxiliary nodes 38.

Example Vehicle for Application of Recalibration Procedure

Figure 2:
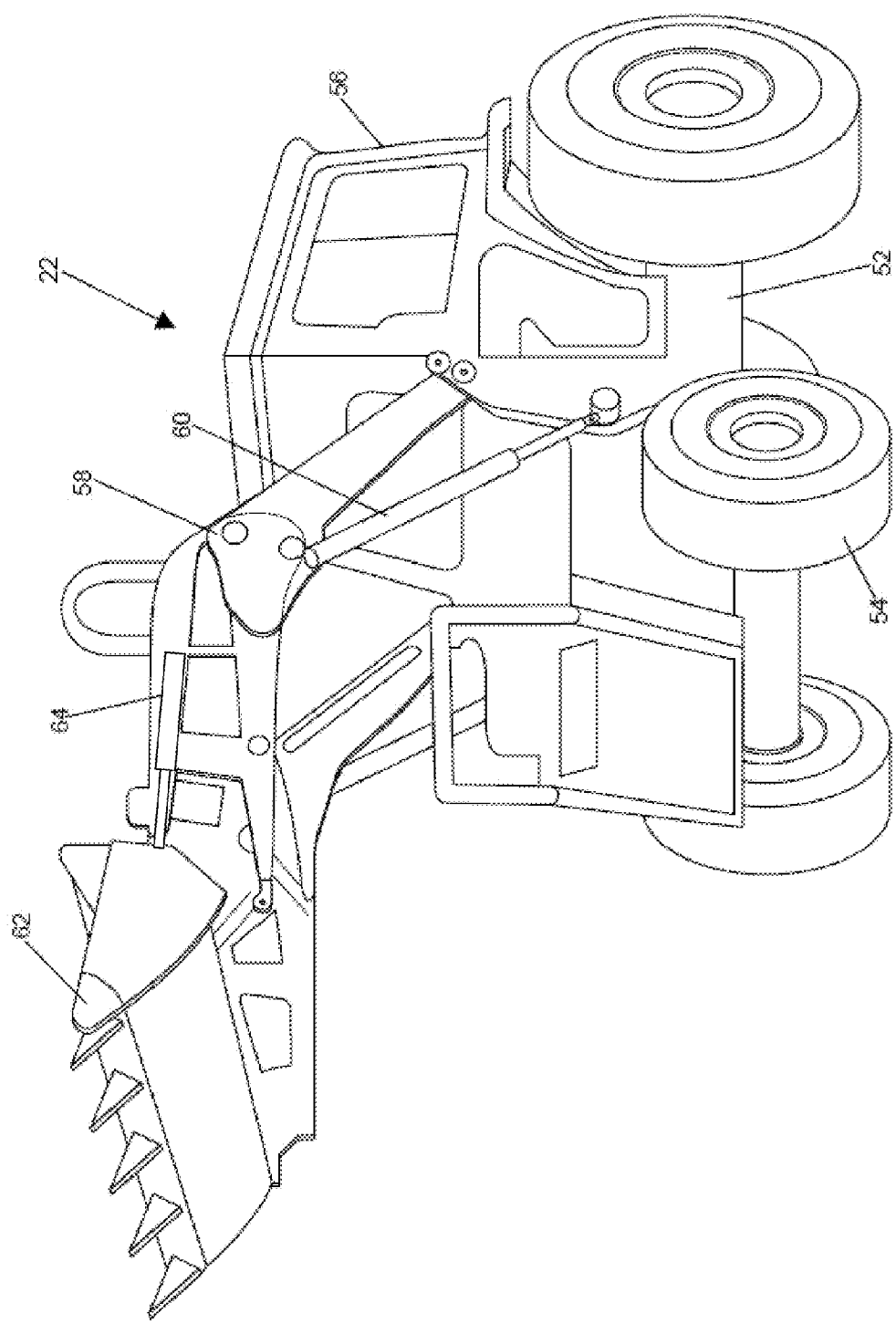
FIG. 2 is a perspective view of a work machine for which the control architecture of FIG. 1 may be used.

FIG. 2 illustrates a wheel loader 22, which is an example of a type of construction vehicle to which aspects of the present disclosure can be applied. The wheel loader includes a chassis or frame 52 supported on wheels 54. A cab 56 is supported on the frame 52. A boom 58 is pivotally connected to the frame 52. A lift cylinder 60 is used to pivot the boom 58 upwardly and downwardly relative to the frame 52. A bucket 62 is pivotally mounted at the end of the boom 58. A tilt cylinder 64 is used to pivot the bucket 62 relative to the boom 58.

Example Architecture Schematic

Figure 3:
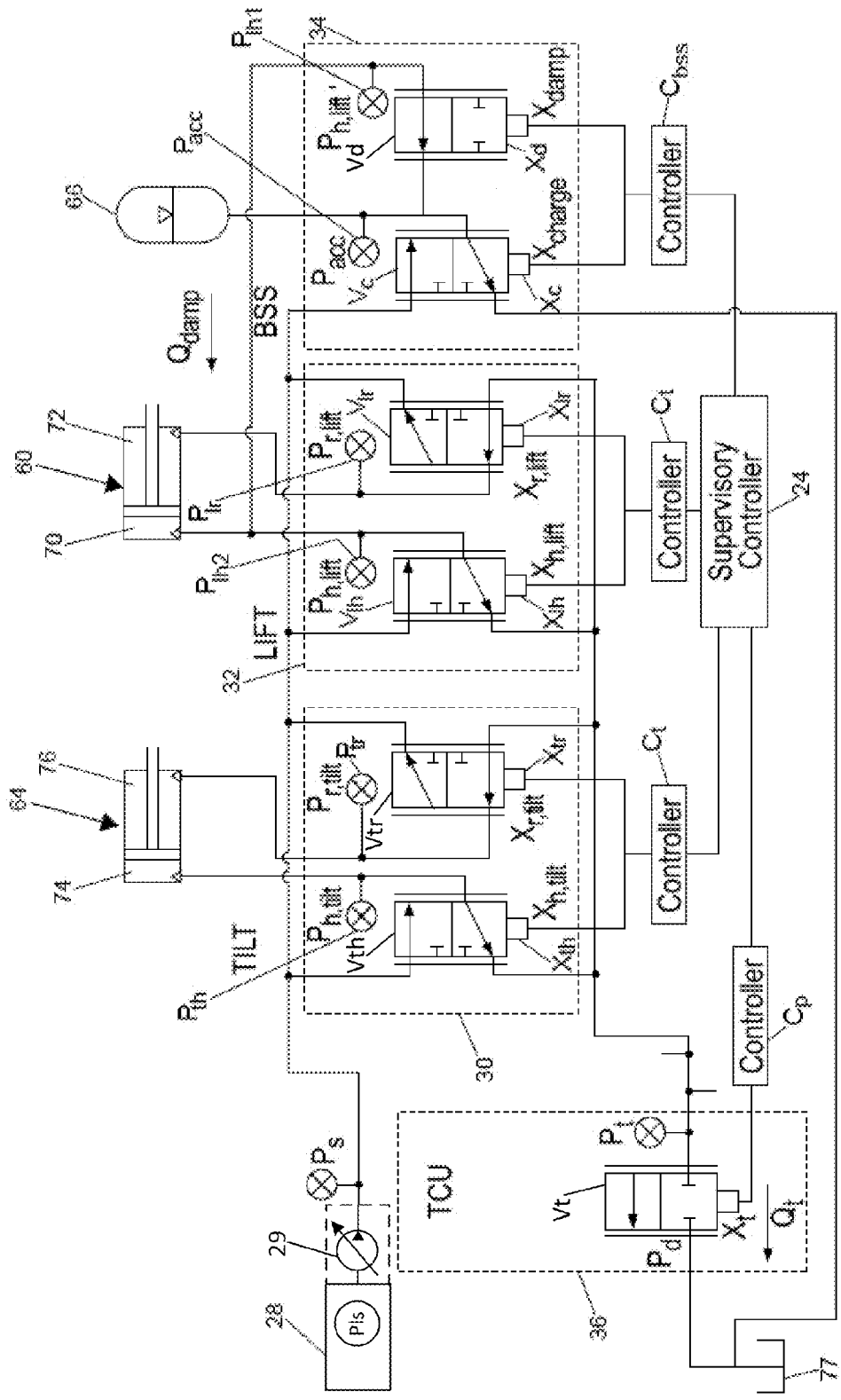
FIG. 3 is a schematic of a hydraulic system and electronic control system that may be associated with the work machine of FIG. 2.

FIG. 3 illustrates a schematic of system architecture suitable for use in controlling the hydraulic actuation system of the wheel loader 22. The architecture includes the supervisory controller 24 that interfaces with the pump control node 28, the tilt cylinder control node 30, the lift cylinder control node 32, the boom suspension system control node 34 and the tank control unit node 36 (auxiliary nodes are not shown). The pump control node 28 controls the hydraulic fluid pressure and flow rate needed to satisfy the flow and pressure requirements of the tilt cylinder control node 30, the lift cylinder control node 32 and the boom suspension system control node 34. The tank control unit node 36 receives the hydraulic fluid flow discharged from the tilt cylinder control node 30, the lift cylinder control node 32 and the boom suspension system control node 34. The tilt cylinder control node 30 controls the hydraulic fluid flow provided to and from the tilt cylinder 64 of the wheel loader 22. The lift cylinder control node 32 controls the hydraulic fluid flow provided to and from the lift cylinder 60 of the wheel loader 22. The boom suspension system control node 34 controls the hydraulic fluid flow provided to and from an accumulator 66. The boom suspension system control node 34 also controls fluid communication between the accumulator 66 and the lift cylinder 60.

The tilt cylinder control node 30 is in fluid communication with the one or more pumps of the pump control node 28 and functions to selectively place a head side 74 or a rod side 76 of the tilt cylinder 64 and fluid communication with the pump or pumps. Similarly, the tilt cylinder control node 30 is in fluid communication with the system tank 77 (i.e., the system reservoir) through the tank control unit node 36 and functions to selectively place the head side 74 or rod side 76 of the tilt cylinder 64 and fluid communication with the tank 77.

The tilt cylinder control module 30 includes a head side flow control valve assembly Vth that selectively places the head side 74 of the tilt cylinder 64 in fluid communication with either the system pump/pumps or the system tank. The tilt cylinder control node 30 also includes a rod side flow control valve assembly Vtr that selectively places the rod side 76 of the tilt cylinder 64 in fluid communication with either the system pump/pumps or the system tank. Valve position sensors Xth and Xtr are provided for respectively sensing the spool positions (i.e., the sensors detect positions of valve spools within valve sleeves, such as LVDT type sensors) of the head side flow control valve Vth and the rod side flow control valve Vtr. Additionally, pressure sensors Pth and Ptr are provided for respectively sensing the head side and rod side pressures of the tilt cylinder 64. In one embodiment, the pressure sensors in the system are strain-based pressure sensors. The tilt cylinder control node 30 also includes a component controller Ct that controls operation of the valves Vth, Vtr based on commands (e.g., mode, pressure or spool position demands, etc.) received from a supervisory controller 24 and feedback provided by the sensors of the node. The component controller Ct also monitors the node for failure conditions and reports any detected failure conditions to the supervisory controller 24 as raised fault flags.

The lift cylinder control node 32 is in fluid communication with one or more pumps of the pump control node 28 and functions to selectively place the one or more pumps in fluid communication with a head side 70 or a rod side 72 of the lift cylinder 60. Similarly, the lift cylinder control node 32 is in fluid communication with the tank 77 through the tank control unit node 36 and is configured to selectively place the head side 70 and the rod side 72 of the boom cylinder 60 in fluid communication with the tank 77.

The lift cylinder control node 32 includes a head side flow control valve assembly Vlh and a rod side flow control valve assembly Vlr. The head side flow control valve Vlh is configured to selectively place the head side 70 of the boom cylinder 60 in fluid communication with either the one or more pumps of the pump control node 28 or the system tank 77. The rod side flow control valve Vlr is configured to selectively place a rod side 72 of the boom cylinder 60 in fluid communication with either one of the system pumps or the system tank 77. The lift cylinder control mode 32 further includes a head side valve position sensor Xlh for sensing a spool position of the head side valve Vlh and a rod side valve position sensor Xlr for sensing the spool position of the rod side flow control valve Vlr. In one embodiment, Xlh and Xlr are LVDT type position sensors. The lift cylinder control node 32 also includes a pressure sensor Plh2 for sensing the pressure of the head side 70 of the boom cylinder 60, and a pressure sensor Plr for sensing the hydraulic pressure at the rod side 72 of the boom cylinder 60. The lift cylinder control node 32 further includes a component level controller Cl that interfaces with the various sensors of the lift cylinder control node 32. The component controller Cl also interfaces with the supervisory controller 24. The component controller Cl controls the operation of the valves Vlh, Vlr based on demand signals (e.g., mode, pressure, spool position demands, etc.) sent to the component controller Cl by the supervisory controller 24 and based on feedback provided by the sensors of the lift cylinder control node 32. The component controller Ll also monitors the fault conditions that may arise within the lift cylinder control node 32 and reports such fault conditions to the supervisory controller 24 as raised fault flags.

The boom suspension system control node 34 is in fluid communication with the one or more pumps of the pump control node 28 and is configured to selectively place an accumulator 66 in fluid communication with the one or more pumps to charge the accumulator 66. The boom suspension system control node 34 can also place the accumulator 66 in fluid communication with the tank 77 and/or the head side 70 of the lift cylinder 60.

The boom suspension system control node 34 includes a charge valve Vc and a damping valve Vd. The charge valve Vc can be used to charge the accumulator 66 by placing the accumulator 66 in fluid communication with a pump of the pump control node 28. The damping valve Vd is used to selectively place the accumulator 66 in fluid communication with a head side 70 of the boom cylinder 60. The boom suspension system control node 34 further includes a charge valve position sensor Xc that senses the spool position of the charge valve Vc. The boom suspension system control node 34 also includes a damping valve position sensor Xd that senses a position of the damping valve Vd. The boom suspension system control node 34 further includes a pressure sensor Pa that senses a pressure of the accumulator 66, and a pressure sensor Plh1 that senses the pressure at the head side 70 of the boom cylinder 60. The sensors of the boom suspension system control node 34 interface with a node controller Cbss which provides node level control of the boom suspension system control node 34. The controller Cbss interfaces with the supervisory controller 24 and reports fault conditions within the node to the supervisory controller 24 as raised fault flags. The controller sends operational commands (e.g., mode, pressure, spool position demands, etc.) to the valves.

The optional tank control unit node 36 includes a tank flow control valve Vt that controls system flow to the system tank 77. The tank control unit node 36 also includes a pressure sensor Pt that senses the pressure of the system tank 77 at a location upstream from the valve Vt. A position sensor Xt senses a position of the valve Vt. A component controller Ct is provided for controlling operation of the valve Vt. The component controller Ct interfaces with the sensors of the mode and also interfaces with the supervisory controller 24. Operation of the valve Vt is controlled by the component controller Ct based on commands (e.g., mode, pressure, spool position demands, etc.) received from the supervisory controller 24 and feedback from the node sensors. The component controller Ct monitors operation of the node and reports any failure conditions to the supervisory controller 24.

Safe Lowering Procedure

Figure 4:
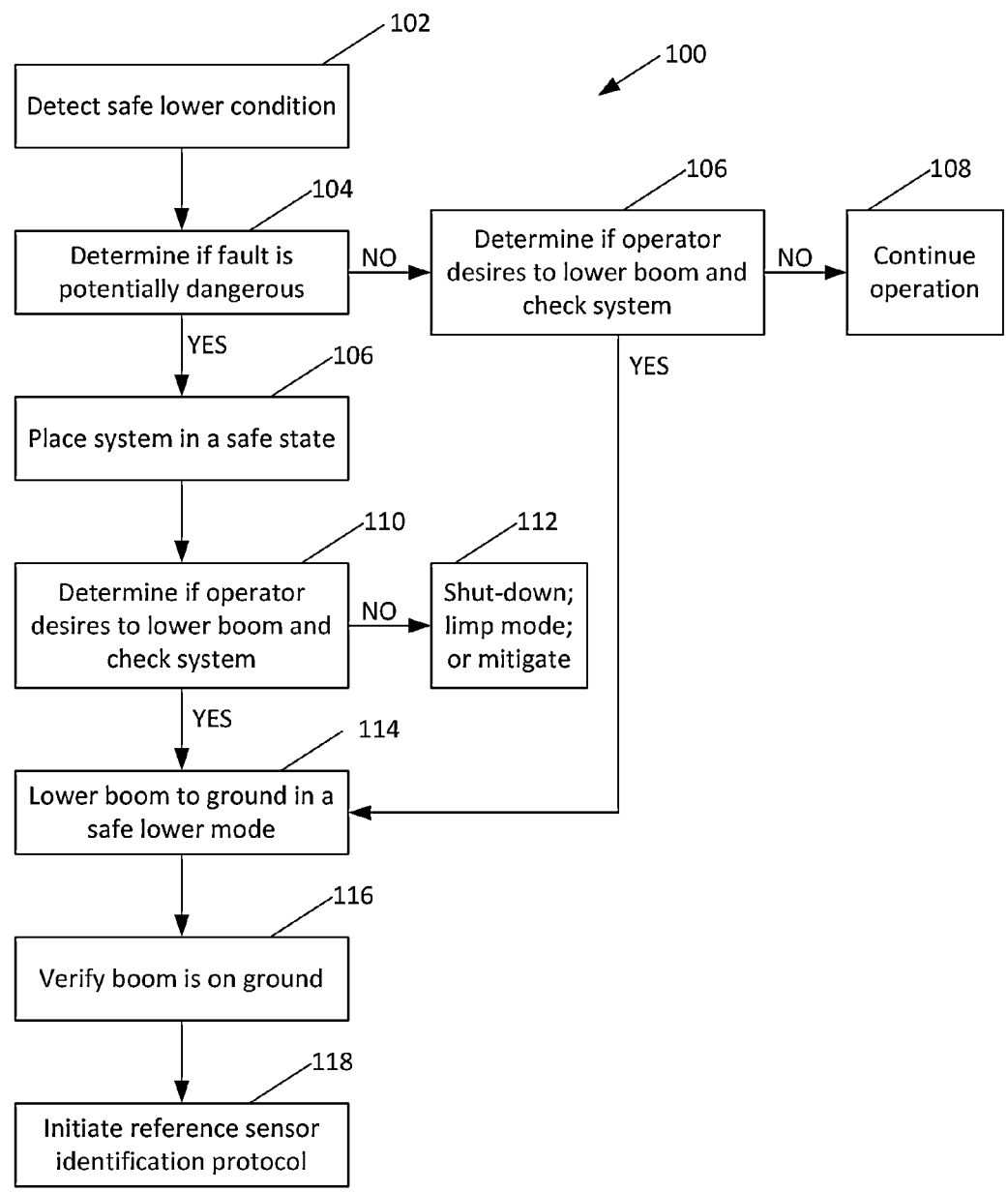
FIG. 4 is a process flow chart showing a safe lower procedure that can be implemented with the work machine of FIG. 2.

Referring to FIG. 4, a safe lowering procedure 100 is shown. An example of a safe lower mode 100 is provided in U.S. Provisional Patent Application 61/737,607, filed on Dec. 14, 2012. U.S. Patent Application 61/737,607 is hereby incorporated by reference herein in its entirety. It is noted that although FIG. 4 diagrammatically shows the method steps in a particular order, the method is not necessarily intended to be limited to being performed in the shown order. Rather at least some of the shown steps may be performed in an overlapping manner, in a different order and/or simultaneously.

In a first step 102 of the method 100, the electronic control system 20 detects a safe lower condition, for example an un-isolated fault somewhere within the control system 20, the work circuit, or another related system associated with work machine 10. Because many electro-hydraulic systems may contain complex algorithms dependent upon a large number of sensors and inputs, many faults are not able to be isolated in real-time. As such, step 102 reflects the initial condition where it is known that a fault has occurred, but it is not necessarily known what component(s) are actually responsible for triggering the fault. Other safe lower conditions exist in which it is preferable to enter the safe lower mode. For example, if a new valve is installed in the system when a load is in the air, the safe lower mode can be helpful as it is possible that air would be in the hydraulic lines and the valve. Also, a new valve usually has to be initialized before being placed into operation. In such cases, it is not necessarily known whether the valve position sensor can be safely trusted, so the load needs to be lowered in a safe manner. Once the load has been lowered air can be fully bled from the system and/or the new valve can be initialized or tested.

In a second step 104, a determination is made as to whether the fault is potentially dangerous. If a determination is made that the fault is unsafe, then the system is placed in a safe state at step 106. If the fault is not potentially dangerous, then a determination is made at step 106 as to whether the operator desires to lower the boom and check the system a step 106. If the operator does not want to check the system, normal operation can proceed under step 108.

If the operator does want to check the system at step 106 or at step 110, then the boom can be lowered to the ground in a safe lower mode at step 114. As stated above, the boom can be safely lowered using the process described in U.S. Patent Application 61/737,607. Where pilot valves are used in the lift cylinder control node 32, additional logic may be provided to determine if it is safe to turn on pilot pressure for the safe lowering operation.

If the system is placed in a safe state at step 106 and it is determined that the operator does not want to check the system at step 110, then the system can be shut down, placed in a limp mode, or other mitigation action can be taken at step 112. At a step 116, the boom is verified as being on the ground. The operator can verify this through an input into the user interface or the system can verify this condition through sensors, for example, a head pressure sensor and/or position sensors on the lift actuator. Once the boom is on the ground, a number of operations can be implemented, for example, step 118 shows a reference sensor identification protocol as being initiated. Step 118 can also or alternatively include implementing the isolation procedure of FIGS. 8-9, the isolation procedure of FIG. 12, and/or the decontamination procedure of FIG. 13.

Establish Reference Pressure Sensor Procedure

Figure 5:
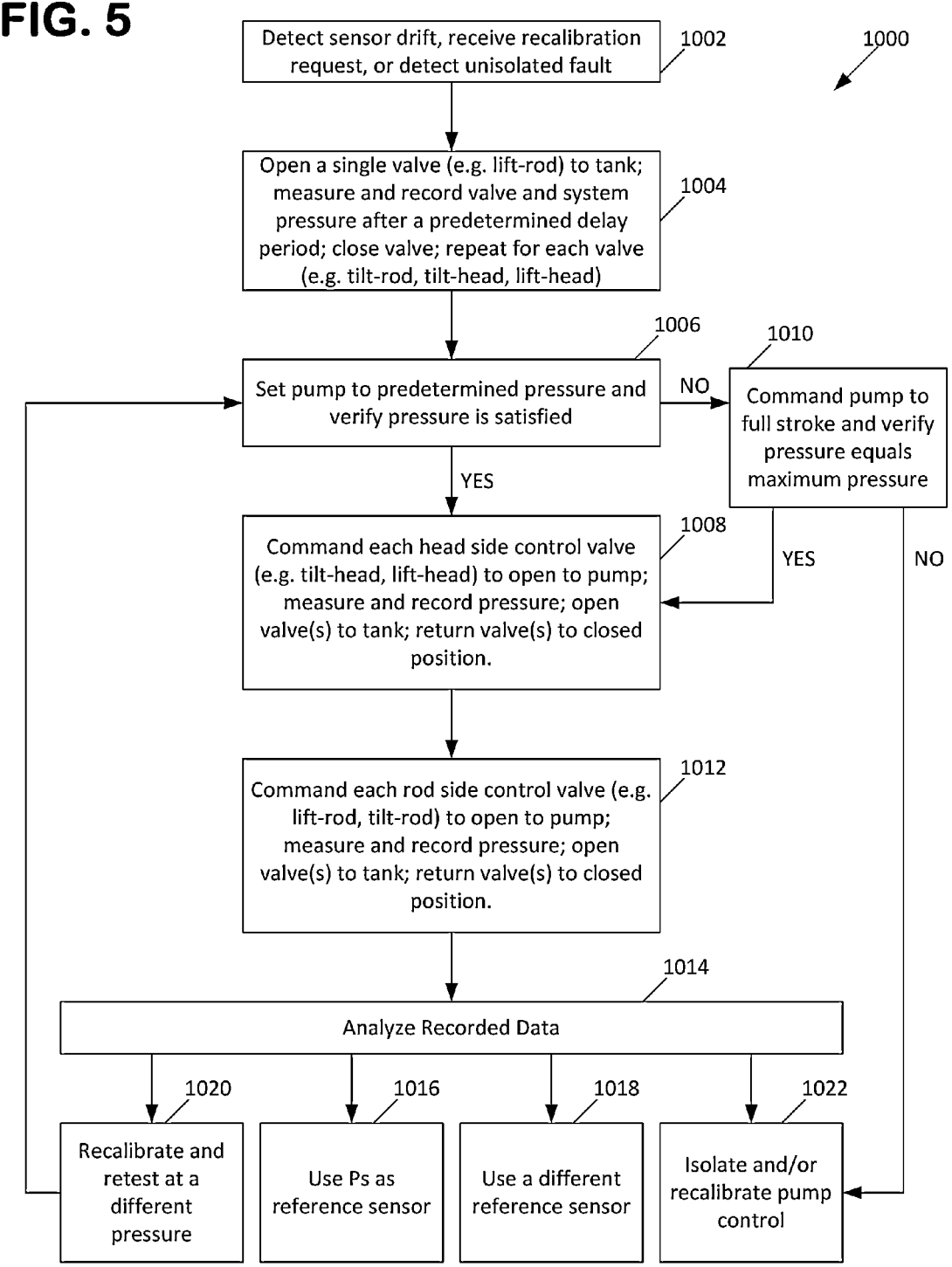
FIG. 5 is a process flow chart showing a procedure in which a pressure sensor in the system shown in FIG. 3 is established as a reference sensor in a fault isolation procedure.

Referring to FIG. 5, a procedure 1000 is initiated in which a master reference pressure sensor is established for use in the isolation procedure 1100 of FIGS. 8 and 9. A decision chart, shown at FIGS. 6 and 7, is also presented which may be used in conjunction with procedure 1000. A similar procedure and decision chart are disclosed in U.S. Provisional Patent Application 61/737,612, filed on Dec. 14, 2012. U.S. Patent Application 61/737,612 is hereby incorporated by reference herein in its entirety. As disclosed in U.S. 61/737,612, procedure 1000 may be used to establish a master pressure sensor for use in a recalibration procedure, an isolation procedure, and a combined recalibration and isolation procedure. It is noted that although the figures diagrammatically show steps in a particular order, the described procedures are not necessarily intended to be limited to being performed in the shown order. Rather at least some of the shown steps may be performed in an overlapping manner, in a different order and/or simultaneously.

In a first step 1002 of the method 1000, the electronic control system 20 detects that one or more sensors have faulted, drifted, or receives a request to recalibrate or isolate the sensors. In another circumstance, an un-isolated fault is detected somewhere within the controller(s), the work circuit, or another related system associated with work machine 22. Because many electro-hydraulic systems may contain complex algorithms dependent upon a large number of sensors and inputs, a fault condition is frequently identified before the actual fault is isolated. As such, step 1002 can reflect the initial condition where it is known that a fault has occurred, but it is not known what component(s) are actually responsible for triggering the fault. Accordingly, the recalibration process 1100, discussed in U.S. 61/737,612, can be used after method 1000 is completed as a first approach to resolving the fault without having to resort to an off-line fault isolation process and/or a stand-alone process to recalibrate the sensors after unacceptable sensor drift has been detected.

At step 1004, while the system is still on-line, each of the tilt and lift valves (Vth, Vtr, Vlh, Vlr) are sequentially opened to the tank 77 with the tank valve Vt, where provided, in the open position. For each valve, the associated pressure at the valve and the system pressure are recorded. Optionally, a predetermined delay after opening the valve to tank may be implemented before recording the pressure. Once the pressures are recorded, the valve is commanded to the closed or neutral position and the next valve is opened to the tank.

As an example illustration of step 1004, the following order could be used after valve Vt, where provided, is opened: (1) command valve Vth to open to the tank 77, sense and record the pressure at Pth and Ps after a predetermined delay, command valve Vth to the closed position; (2) command valve Vtr to open to the tank 77, sense and record the pressure at Ptr and Ps after a predetermined delay, command valve Vtr to the closed position; (1) command valve Vlh to open to the tank 77, sense and record the pressure at Plh2 and Ps after a predetermined delay, command valve Vlh to the closed position; (2) command valve Vlr to open to the tank 77, sense and record the pressure at Plr and Ps after a predetermined delay, command valve Vlr to the closed position. One skilled in the art will understand, upon learning the concepts presented herein, that other valve orders are possible.

At step 1006, the pump 29 of the pump control node 28 responsible for providing fluid pressure to the hydraulic circuit is commanded to a predetermined pressure set point. Where the pressure sensor Ps indicates that the system pressure equals the predetermined pressure, the procedure moves to step 1008. Where the system pressure does not equal the predetermined pressure set point, a further evaluation may be necessary. If the signal from sensor Ps is unstable and below the minimum calibration pressure, a fault within the pump control node 28 may exist. Where the signal from sensor Ps is stable and above the minimum calibration pressure, a number of potential faults may exist, for example a pump control node fault, a hydraulic short, and/or a steering demand fault.

In either case, where pump 29 is unable to meet the pressure set point, the system will command the pump 29 to full stroke or maximum output at step 1010 where the pump pressure at Ps is calibrated against the pressure compensator associated with the pump 29. Where it is determined that Ps equals the maximum pressure of the compensator, then the procedure is allowed to proceed to step 1008. Where the pressure at Ps is not equal to the expected maximum compensator pressure, the procedure moves to step 1022 where a fault in the pump control node 28 must be isolated and/or recalibrated. If, after step 1022 is completed and further faults exist, the procedure may be reinitiated at step 1006 where the proper operation of the pump 29 and node 28 can be verified before proceeding to step 1008.

At step 1008, the head side valves Vth, Vlh of the tilt and lift actuators 60, 64 are commanded to open to the pump 29. Once opened, and after an optional time delay, the pressures at the Pth; Plh2; and Ps are recorded. Subsequently, valves Vth, Vlh are opened to the tank and then placed in the closed position after an optional time delay. By only opening valves on one side of each actuator 60, 64 it can be better assured that no movement of a load occurs. It is also noted that the while actuators 60, 64 are shown as being linear actuators, they may also be hydraulic motors.

At step 1012, the rod side valves Vtr, Vlr of the tilt and lift actuators 60, 64 are commanded to open to the pump 29. Once opened, and after an optional time delay, the pressures at the Ptr; Plr; and Ps are recorded. Subsequently, valves Vth, Vlh are opened to the tank and then placed in the closed position after an optional time delay.

At step 1014, the recorded data is analyzed to determine if Ps, or another sensor, can be used as a trusted reference sensor for isolation or recalibration. Four outcomes are shown as being possible from the analysis: (1) Ps can be trusted and will be used as a reference sensor—outcome 1016; (2) Ps cannot be trusted, but another reference sensor, such as Pls+margin can be trusted, and will be used as a reference sensor—outcome 1018; (3) a recalibration can be implemented, after which the procedure returns back to step 1006 to determine if Ps can be trusted—outcome 1020; or there is an apparent fault in the pump control node 28 which must be isolated or corrected—outcome 1022.

Referring to FIGS. 6-7, a decision chart 1014*a*, 1014*b* (hereafter referred to collectively as chart 1014) is shown that can be used in analysis step 1014 to determine which of outcomes 1016-1022 result. In the analysis step 1014, Ps is initially compared to readings from the other pressure sensors. The decision chart, as disclosed, includes condition data that utilizes different threshold values for these reading differences. For example, a fault condition will be identified if the difference is more than a first threshold, for example 6 bar. A calibration condition can be identified if the difference is more than a second threshold, but less than the first threshold, for example, the difference is between 2 bar and 6 bar. Where the difference is less than the second threshold value, then the difference is small enough to not trigger either a fault condition or a calibration condition. It should be understood that more or fewer threshold conditions could be utilized and that different numerical values may be used for the threshold values in analysis step 1014 without departing from the concepts herein.

Referring to chart 1014, an action is described for each possible data analysis result based on the number and combination of fault and calibration conditions identified. It is noted that the particular cases described in the paragraphs below are directed to a system with four valves (Vth, Vtr, Vlh, Vlr) with pressure sensors (Pth, Ptr, Plh2, Plr), a system pressure sensor (Ps), and a load sense pressure sensor (Pls). The decision chart 1014 can be modified as necessary to account for other cases that would arise from other system configurations. It is also noted that the decision chart refers to both isolation and recalibration procedures, as the chart 1014 and procedure 1000 are both usable for both subsequent procedures which may be performed either sequentially or at the same time.

Case 1 is an analysis result where no faults are identified relative to Ps. In this case, Ps can be taken to be trusted and used as a reference, and outcome 1016 results.

Case 2 is an analysis result where only one fault is identified relative to Ps. In this case, it is still acceptable to use Ps as a trusted reference, and outcome 1016 results. It is noted that any subsequent recalibration or isolation procedure can be configured to start with an evaluation of the sensor associated with the fault condition.

Case 3 is an analysis result where two faults relative to Ps are identified in the same service, meaning that two faults are identified that are both either associated with lift actuator 60 or tilt actuator 64. In this case, it is still acceptable to use Ps as a trusted reference, and outcome 1016 results. It is noted that any subsequent recalibration or isolation procedure will start with an evaluation of the sensors associated with the fault condition.

Case 4 is an analysis result where two faults relative to Ps are identified in different services. Where Ps is equal to Pls plus a predetermined margin (i.e. Pls+margin), then it is acceptable to use Ps as a trusted reference, and outcome 1016 results. However, where this is not the case, then the pump control node 28 must be isolated or corrected under outcome 1022 before any further steps can be taken.

Case 5 is an analysis result where three faults relative to Ps are identified. If the three faulted sensors agree with Pls+margin, where the margin is estimated from the average of the three faulted sensors, then outcome 1018 results and Pls+margin can be trusted and used for the recalibration. However, where this is not the case, then the pump control node 28 must be isolated or corrected under outcome 1022 before any further steps can be taken.

Case 6 is an analysis result where four faults relative to Ps are identified, meaning that none of the pressure sensors agree with Ps. If the four faulted sensors agree with Pls+margin, where the margin is estimated from the average of the three faulted sensors, then outcome 1018 results and Pls+margin can be trusted and used for the recalibration. However, where this is not the case, then the pump control node 28 must be isolated or corrected under outcome 1022 before any further steps can be taken. If the standard deviation of the four faulted sensors is clustered, then a fault likely exists with the Ps or Pls sensors.

Case 7 is an analysis result where one fault condition and two calibration conditions relative to Ps are identified. In this instance, outcome 1020 results and a recalibration of Ps can be implemented, after which the procedure returns back to step 1006 to determine if Ps can be trusted, but with the system at a different pressure. The recalibration of Ps can be performed with reference to the two calibrations and the one good sensor and/or with reference to a master reference sensor.

Case 8 is an analysis result where one fault condition and three calibration conditions relative to Ps are identified. In this instance, outcome 1020 results and a recalibration of Ps can be implemented, after which the procedure returns back to step 1006 to determine if Ps can be trusted, but with the system at a different pressure. The recalibration of Ps can be performed with reference to the three calibrations and/or with reference to a master reference sensor.

Case 9 is an analysis result where one fault condition and one calibration condition are identified relative to Ps in the same service, meaning that two faults are identified that are both either associated with lift actuator 60 or tilt actuator 64. In this case, it is still acceptable to use Ps as a trusted reference, and outcome 1016 results. It is noted that any subsequent recalibration or isolation procedure can be configured to start with an evaluation of the sensor associated with the fault condition.

Case 10 is an analysis result where once fault condition and one calibration condition relative to Ps are identified in different services. Where Ps is equal to Pls plus a predetermined margin (i.e. Pls+margin), then it is acceptable to use Ps as a trusted reference, and outcome 1016 results. However, where this is not the case, then the pump control node 28 must be isolated or corrected under outcome 1022 before any further steps can be taken.

Case 11 is an analysis result where two fault conditions on the same service and one calibration condition relative to Ps are identified. In this instance, outcome 1020 results and a recalibration of Ps can be implemented, after which the procedure returns back to step 1006 to determine if Ps can be trusted, but with the system at a different pressure. The recalibration of Ps can be performed with reference to the one calibration condition sensor and/or with reference to a master reference sensor.

Case 12 is an analysis result where two fault conditions on a different service and one calibration condition relative to Ps are identified. In this instance, outcome 1020 results and a recalibration of Ps can be implemented, after which the procedure returns back to step 1006 to determine if Ps can be trusted, but with the system at a different pressure. The recalibration of Ps can be performed with reference to the one calibration condition sensor and the one good sensor and/or with reference to a master reference sensor.

Case 13 is an analysis result where two fault conditions and two calibration conditions relative to Ps are identified. If the four faulted/calibration sensors agree with Pls+margin, where the margin is estimated from the average of the four faulted/calibration sensors, then outcome 1018 results and Pls+margin can be trusted and used for the isolation or recalibration procedure. However, where this is not the case, then the pump control node 28 must be isolated or corrected under outcome 1022 before any further steps can be taken. If the standard deviation of the four faulted/calibration sensors is clustered, then a fault likely exists with the Ps or Pls sensors.

Case 14 is an analysis result where three fault conditions and one calibration condition relative to Ps are identified. If the three faulted sensors agree with Pls+margin, where the margin is estimated from the average of the three faulted sensors, then outcome 1018 results and Pls+margin can be trusted and used for the isolation or recalibration. However, where this is not the case, then the pump control node 28 must be isolated or corrected under outcome 1022 before any further steps can be taken.

Case 15 is an analysis result where three calibration conditions relative to Ps are identified. In this instance, outcome 1020 results and a recalibration of Ps can be implemented, after which the procedure returns back to step 1006 to determine if Ps can be trusted, but with the system at a different pressure. The recalibration of Ps can be performed with reference to the lift head side sensor reading, to the nearest calibration condition sensor, and/or to a selected master reference sensor.

Case 16 is an analysis result where four calibration conditions relative to Ps are identified. In this instance, outcome 1020 results and a recalibration of Ps can be implemented, after which the procedure returns back to step 1006 to determine if Ps can be trusted, but with the system at a different pressure. The recalibration of Ps can be performed with reference to the lift head side sensor reading, to the nearest calibration condition sensor, and/or to a selected master reference sensor.

Case 17 is an analysis result where one calibration condition relative to Ps is identified. In this instance, the isolation or recalibration can be continued under outcome 1016 or the calibration condition sensor can be recalibrated relative to Ps under outcome 1020. Where it is chosen to recalibrate the calibration condition sensor, the procedure returns back to step 1006 after recalibration to determine if Ps can be trusted, but with the system at a different pressure.

Case 18 is an analysis result where two calibration conditions relative to Ps in the same service are identified. In this instance, outcome 1020 can result and a recalibration of the two calibration condition sensors can be implemented, after which the procedure returns back to step 1006 to determine if Ps can be trusted, but with the system at a different pressure. The recalibration of the two calibration condition sensors can be with reference to Ps. Alternatively, the isolation or recalibration procedure can be continued under outcome 1016 without recalibrating the two sensors associated with the calibration conditions.

Case 19 is an analysis result where two calibration conditions relative to Ps in a different service are identified. In this instance, outcome 1020 can result and a recalibration of the two calibration condition sensors can be implemented, after which the procedure returns back to step 1006 to determine if Ps can be trusted, but with the system at a different pressure. The recalibration of the two calibration condition sensors can be with reference to Ps. Alternatively, the isolation or recalibration can be continued under outcome 1016 without recalibrating the two sensors associated with the calibration conditions.

It is to be understood that the above described cases are exemplary in nature and that other case conditions and corresponding actions may be chosen without departing from the concepts presented herein.

Offline Sensor Isolation

Figure 11:
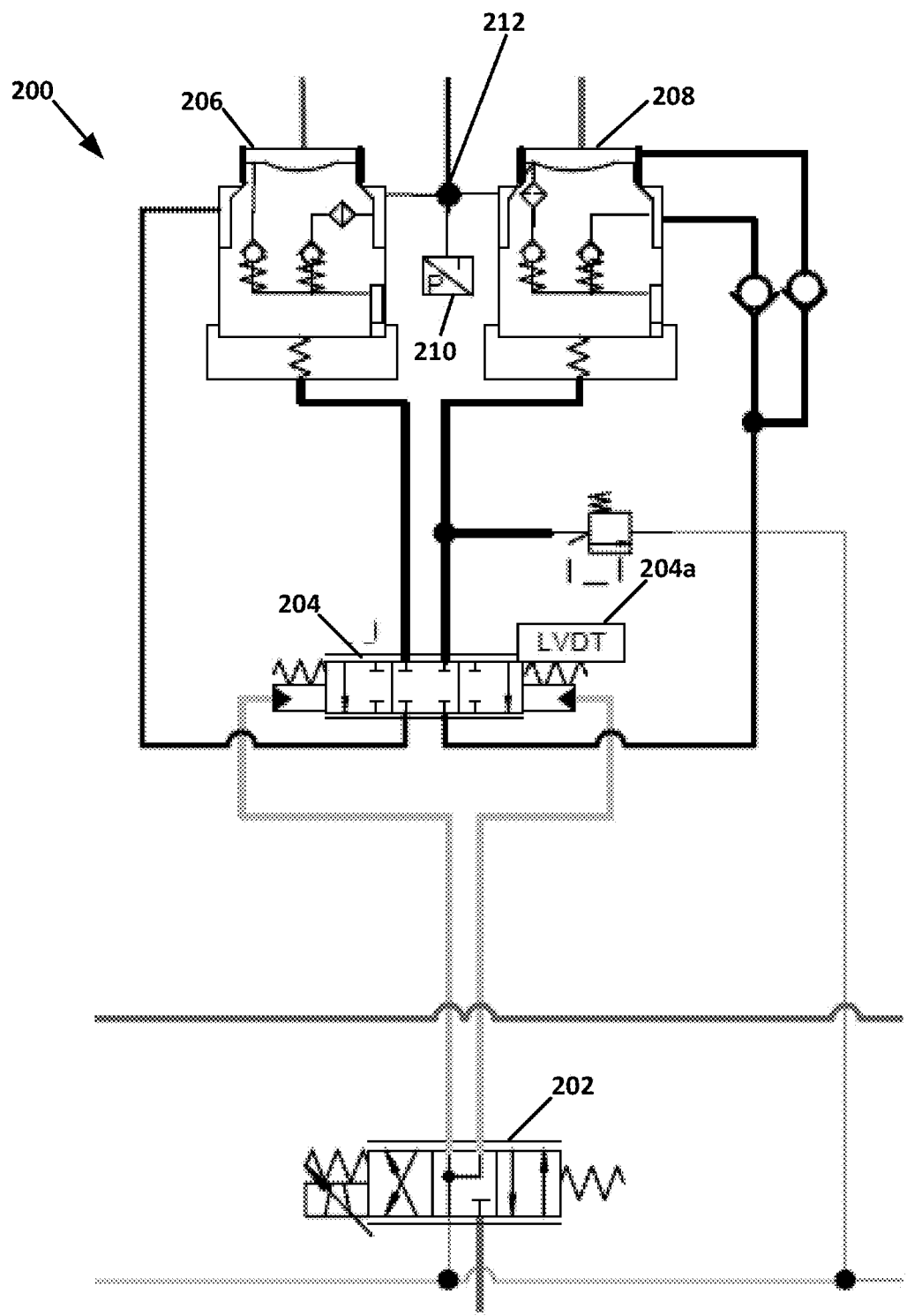
FIG. 11 is a schematic of a control valve assembly that may be used with the hydraulic system of FIG. 3.

Once a reference sensor has been established, the offline sensor isolation process 1100 may be implemented, as shown at FIGS. 8 and 9. It is noted that although four three-way valves are shown for the tilt and lift actuators, two four-way valves could be used instead wherein one four-way valve is associated with each actuator. In such a case the function of Vth and Vtr would be embodied in a single valve as would the function of Vlh and Vlr. Additionally, a valve assembly of the type shown in FIG. 11 may also be used for valves Vth, Vtr, Vlh, and Vlr. As presented, process 1100 is described as being applied to a valve assembly 200 which is shown as including a pilot stage valve 202, a middle stage valve 204 having an LVDT position sensor 204a, a first poppet assembly 206, a second poppet assembly 208, a pressure sensor 210, and a work port 212. The procedure 1100, as applied to the valve assembly 200 of FIG. 11 and can be used to identify a number of faults. For example: a stuck pilot valve, a stuck middle stage valve, a stuck poppet, a stuck poppet check valve, a stuck relief valve, a stuck LVDT, a drifted LVDT offset, a drifted LVDT gain, a stuck pressure sensor, a drifted pressure sensor offset, a drifted pressure sensor gain, and/or a partially blocked pilot or middle stage valve. Also, one skilled in the art, upon learning of the disclosure of this application, will understand that processes 1000 and 1100 can be performed with two-way valves, three-way valves, four-way valves, multiple stage valve assemblies, and combinations thereof without departing from the concepts presented herein. Furthermore, processes 1000 and 1100 can be applied to systems having more than tilt and lift actuator functions.

In a first step 1102 of the process, it is verified that a reference sensor is trusted. This verification may be accomplished through the above described procedure 1000 or through other means. It is also noted that steps 1104 through 1134 of procedure 1100 are performed for one valve assembly 200 at a time in the system. Thus, steps 1104 through 1134 may be completely performed for a single valve and then repeated in their entirety for each subsequent valve. Alternatively, each individual step may be performed for each valve before moving on to the next step.

In a step 1104, the system pump is set to a first pressure setting, for example a set point of 15 bar. In a step 1106, the selected valve is opened to tank to relieve pressure and then commanded to the center position, where its position (e.g. xc) is sensed and recorded after an optional delay. Where a tank control unit is provided, step 1106 also ensures that the tank control unit is opened when the valve is open to tank.

In a step 1108, the valve is fully opened to the pump, where its position (e.g. xp) is sensed and recorded after an optional delay. The system pressure and work port pressure (e.g. Ps, P1) are also sensed and recorded at this time. In a step 1110, the valve is fully opened to the tank (along with TCU where provided), where its position (e.g. xt) is sensed and recorded after an optional delay. The work port and tank pressures (e.g. Pt, Plow) are also sensed and recorded at this time.

At step 1112, the recorded data is analyzed to determine if the pilot or middle stage valves appear to be stuck or blocked. Where this is the case, an anti-contamination mode 1300, discussed later, can be initiated at step 1114. If isolation of a stuck poppet is warranted, the isolation can be initiated at step 1114 and performed with procedure 1200 prior to initiating the anti-contamination procedure 1300. The decision chart 1100a presented at FIG. 10 can be used in performing the analysis under step 1112. The analysis at step 1112, which completes a first phase of the isolation, may include four data analysis results: Evaluations 1 to 4, described below.

At Evaluation 1, the recorded work port pressure P1 is not equal to the recorded system pressure Ps or the recorded tank pressure Pt is not equal to the recorded work port pressure Plow. This Evaluation also involves identifying that there is a mismatch between at least one of the recorded and stored positions for xt, xc, and xp. Either result is indicative of a stuck or blocked pilot or middle valve or a pressure plus LVDT fault. Where this is the case, the anti-contamination mode 1300 can be attempted and the isolation procedure 1100 repeated. If the conditions of Evaluation 1 are not met, the procedure may proceed directly to Phase 2.

At Evaluation 2, the recorded pressures P1 and Ps are equal, the recorded pressures Plow and Pt are equal, and the recorded position xc equals the stored value (e.g. the value stored during initial set up/configuration of the valve) for xc. However, only one of the recorded positions xt, xp equals the corresponding stored value. Where this is the case, the anti-contamination mode 1300 can be attempted and the isolation procedure 1100 repeated.

At Evaluation 3, at most one of the recorded positions xt, xc, xp equals the corresponding stored value, or the recorded center position xc does not equal the stored center position xc. Evaluation 3 also identifies that all three of the recorded positions for xt, xc, xp are equal. These conditions are indicative of a stuck LVDT position sensor. Where this is the case, the procedure 1100 may proceed on to the second phase of the procedure at step 1116.

At Evaluation 4, at most one of the recorded positions xt, xc, xp equals the corresponding stored value, or the recorded center position xc does not equal the stored center position xc. Evaluation 4 also identifies that the recorded positions xt, xc, xp are not equal to each other. This condition is indicative of an LVDT position sensor offset gain or fault. Where this is the case, the procedure 1100 may proceed on to the second phase of the procedure at step 1116. The position sensor may be recalibrated before proceeding.

At step 1118, the valve is commanded to a closed position, and after an optional delay, the system pump is set to a second pressure setting, for example a set point of 25 bar. At this step, the system pressure is recorded as Ps2 and the valve work port pressure is recorded as P2. Where a tank control unit is provided, step 1118 also ensures that the tank control unit is closed.

At step 1120, the recorded data is analyzed. The decision chart 1100a presented at FIG. 10 can be used in performing the analysis under step 1120 which completes a second phase of the isolation. Evaluations 5-8, described below, may be used at step 1120.

At Evaluation 5, the second work port pressure P2 is equal to the second system pressure Ps2 and the first recorded work port pressure P1 is not equal to the second system pressure Ps2. This result is indicative of a stuck or blocked poppet check valve or meter-in poppet. Where this is the case, the anti-contamination mode 1300 can be attempted and the isolation procedure 1100 repeated.

At Evaluation 6, the second work port pressure P2 is equal to the second system pressure Ps2 and the first recorded work port pressure P1 is equal to the second system pressure Ps2. This result is indicative of a stuck pressure sensor.

At Evaluation 7, the second work port pressure P2 is less than the second system pressure. This result is indicative of a stuck valve and/or a pressure fault, but further analysis starting at step 1122 under Phase 3A is required to fully isolate the condition.

At Evaluation 8, the second work port pressure P2 is greater than the second system pressure Ps2. This result may be indicative of a pressure sensor fault or a meter-out valve that is stuck closed (e.g. the load is in the air), but further analysis starting at step 1128 under Phase 3B is required to fully isolate the condition.

At step 1124, the valve is fully opened to the pump and the data is further analyzed at step 1126 at Evaluations 9-12 shown at FIG. 10, and as described below.

At Evaluation 9, the tank pressure is greater than zero or the difference between the second system pressure Ps2 and the second work port pressure P2 is greater than zero. This result is indicative of a meter-out valve or relief valve that is stuck in the open position.

At Evaluation 10, the recorded pressure P1 is equal to the recorded system pressure Ps and the second work port pressure P2 is equal to the second system pressure Ps2. This result is indicative of a meter-in valve or meter-out valve that is in the stuck closed position, or indicative that no fault is present. Isolation procedure 1200 may be used to identify a stuck poppet.

At Evaluation 11, the second work port pressure P2 is not equal to the recorded work port pressure P1 and either the recorded pressure P1 is not equal to the recorded system pressure Ps or the second pressure P2 is not equal to the system pressure Ps2. This result is indicative of a pressure sensor offset or gain fault. A recalibration of the pressure sensor may be performed.

At Evaluation 12, the second work port pressure P2 is equal to the recorded work port pressure P1 and either the recorded pressure P1 is not equal to the recorded system pressure Ps or the second pressure P2 is not equal to the system pressure Ps2. This result is indicative of a stuck pressure sensor or a pressure sensor with a large offset fault. A recalibration of the pressure sensor may be performed.

At step 1130, the valve is fully opened to the pump and the pump pressure is increased by a first increment (e.g. 5 bar), and the work port pressure is recorded as P2 and the system pressure is recorded as Ps2. At step 1132, the pump pressure is increased by a second increment (e.g. 25 bar) to result in a work port pressure P3 and a system pressure Ps3. The data is further analyzed at step 1134 at Evaluations 13-15 shown at FIG. 10, and as described below.

At Evaluation 13, work port pressure P3 is equal to system pressure Ps and the recorded work port pressure P2 is equal to the recorded system pressure Ps2. This condition is indicative of a meter-out valve that is stuck closed.

At Evaluation 14, work port pressure P3 is equal to the recorded work port pressure P2 and either the work port pressure P3 is not equal to system pressure Ps3 or the work port pressure P2 is not equal to the system pressure Ps2. This condition is indicative of a pressure sensor that is stuck.

At Evaluation 15, work port pressure P3 is not equal to the recorded work port pressure P2 and either the work port pressure P3 is not equal to system pressure Ps3 or the work port pressure P2 is not equal to the system pressure Ps2. This result is indicative of a pressure sensor gain or offset fault. A recalibration of the pressure sensor may be performed.

Stuck Poppet Isolation Procedure

Figure 12:
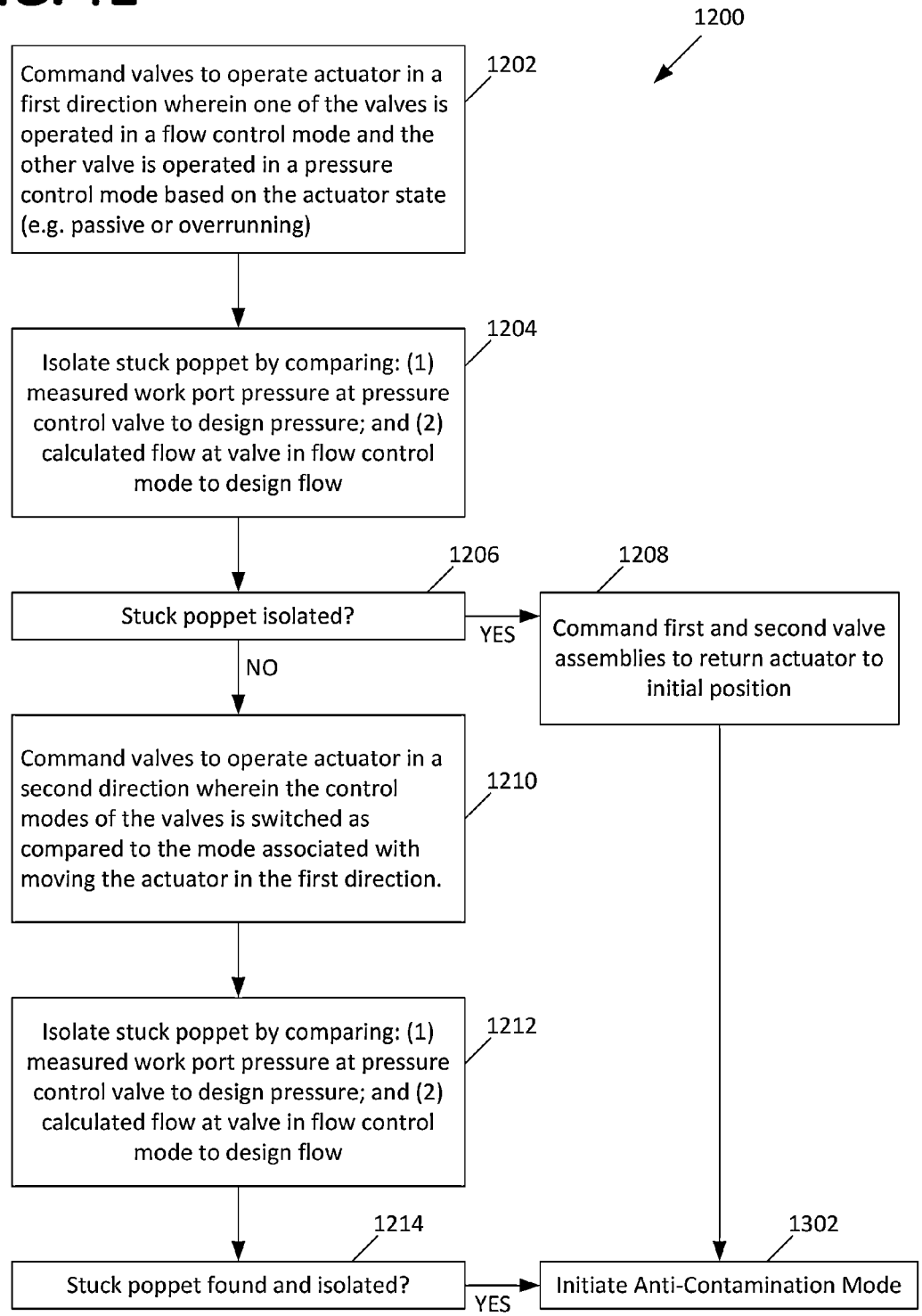
FIG. 12 is a process flow chart showing a procedure for isolating a work port associated with a stuck poppet that may be associated with the hydraulic work circuit of FIG. 3.

Referring to FIG. 12, an isolation procedure 1200 is shown for isolating a stuck poppet assembly. In a step 1202, the valves associated with an actuator (e.g. the lift actuator) are commanded to operate the actuator in a first direction. In the embodiment shown, the valves are configured to operate such that one valve is operated in a flow control mode while the other valve is operated in a pressure control mode based on the actuator state. The actuator may be in a passive state or an overrunning state. By use of the term "passive state" it is meant to indicate that the load is being forced in a direction that is generally opposite the direction of an external opposing force, such as gravity (i.e. the valves are commanded to move the load upward against gravity). By use of the term "overrunning condition" it is meant to indicate that the load moving in a direction that is in the same general direction of an external force, such as gravity (i.e. the valves are commanded to move the load downward with gravity assisting). In one embodiment, the meter-in valve assembly will operate in a flow control mode and the meter-out valve assembly will operate in a pressure control mode when the actuator is in a passive state. Conversely, the meter-in valve assembly will operate in a pressure control mode and the meter-out valve assembly will operate in a flow control mode when the actuator is in an overrunning state.

At a step 1204, the stuck poppet is attempted to be isolated by comparing the measured work port pressure at the valve in the pressure control mode to the design pressure value and by comparing the calculated flow at the valve in flow control mode to a design flow value.

Where the first direction of the actuator results in a passive state, several useful comparisons can be made, as follows: (1) where the calculated flow exceeds the design flow, a calibration error is likely present; (2) where the calculated flow is less than the design flow and where the work port pressure equals the design pressure, the work port associated with the meter-in valve can be identified as being stuck closed; (3) where the calculated flow is less than the design flow and where the work port pressure is greater than the design pressure, the work port associated with the meter-out valve can be identified as being stuck closed. Where the calculated and design flows are equal, the stuck poppet cannot yet be isolated, and the procedure continues at step 1210. If a stuck poppet is identified and isolated, the process continues to step 1208 where the valves are returned to their initial positions. Additionally, the anti-contamination mode can be initiated at step 1302.

Where the first direction results in an overrunning condition, several useful comparisons can be made, as follows: (1) where the work port pressure is less than the design pressure, the work port associated with the meter-in valve can be identified as being stuck closed; (2) where the work port pressure equals the design pressure and the calculated flow is greater than the design flow, a calibration error can be identified; (3) where the work port pressure equals the design pressure and the calculated flow is less than the design flow, the work port associated with the meter-out valve can be identified as being stuck closed. Where the calculated and design flows are equal, the stuck poppet cannot yet be isolated, and the procedure continues at step 1210. If a stuck poppet is identified and isolated, the valves can be returned to their initial positions at step 1208, and the anti-contamination mode can be initiated at step 1302.

In a step 1210, the valves are commanded to operate the actuator in a second direction such that the control mode of each valve is switched, as compared to the resulting mode of step 1202. For example, if the meter-in valve was in the flow control mode at step 1202, step 1210 results in the meter-in valve being placed in a pressure control mode.

Where the second direction of the actuator results in a passive state, several useful comparisons can be made, as follows: (1) where the calculated flow exceeds the design flow, a calibration error is likely present; (2) where the calculated flow is less than the design flow and where the work port pressure equals the design pressure, the work port associated with the meter-in valve can be identified as being stuck closed; (3) where the calculated flow is less than the design flow and where the work port pressure is greater than the design pressure, the work port associated with the meter-out valve can be identified as being stuck closed. Where the calculated and design flows are equal, then it can be assessed that there is no stuck poppet. If a stuck poppet is identified and isolated at step 1214, the anti-contamination mode can be initiated at step 1302.

Where the second direction results in an overrunning condition, several useful comparisons can be made, as follows: (1) where the work port pressure is less than the design pressure, the work port associated with the meter-in valve can be identified as being stuck closed; (2) where the work port pressure equals the design pressure and the calculated flow is greater than the design flow, a calibration error can be identified; (3) where the work port pressure equals the design pressure and the calculated flow is less than the design flow, the work port associated with the meter-out valve can be identified as being stuck closed. Where the calculated and design flows are equal, then it can be assessed that there is no stuck poppet. If a stuck poppet is identified and isolated at step 1214, the anti-contamination mode can be initiated at step 1302.

Anti-Contamination Mode

Figure 13:
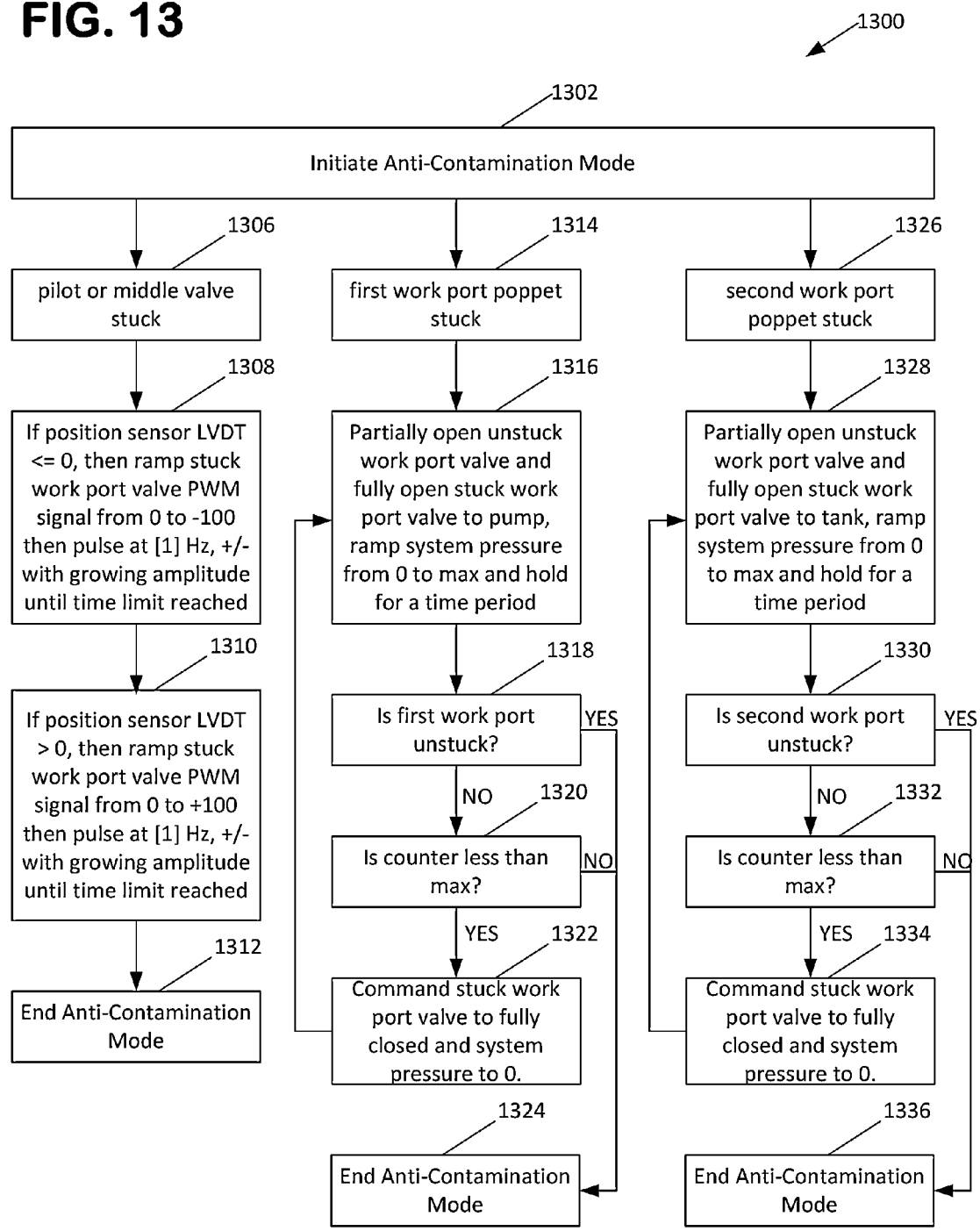
FIG. 13 is a process flow chart showing a procedure for freeing a stuck valve or poppet associated with the hydraulic circuit of FIG. 3.

Referring to FIG. 13, the anti-contamination mode 1300 is further described. At step 1302, the anti-contamination mode is initiated. The anti-contamination mode 1300 is for attempting to dislodging chips or other debris, with pressure or position movements, from a stuck valve or poppet such that it may operate freely. As described above, this mode may be initiated as the end result of the fault isolation procedure 1100 or the poppet isolation procedure 1200. Based on the results of the isolation procedure 1100 and/or the results of the isolation procedure 1200, the stuck valve will be isolated to being the pilot or middle valve at condition 1306, the poppet assembly associated with the first work port (meter-in valve/first valve) at condition 1314, or the poppet assembly associated with the second work port (meter-in valve/first valve) at condition 1326.

At steps 1308 and 1310, which are implemented where condition 1306 exists, the spool is moved away from the direction of blockage by ramping the stuck work port valve signal to fully open and then by pulsing the signal at a frequency, for example 1 Hz. In one embodiment, the pulses can have a growing amplitude until a time limit or other parameter is reached. Step 1308 is used where the position sensor reads a position corresponding to the pump side, for example a position of less than zero, whereby the pilot valve is commanded to fully open the middle valve assembly to the pump. Step 1310 is used where the position sensor reads a position corresponding to the tank side, for example a position of more than zero, whereby the pilot valve is commanded to fully open the middle valve assembly to the tank. The anti-contamination mode is exited at step 1312.

At step 1316, which is implemented where condition 1314 exists, the unstuck work port valve is partially opened and the valve associated with the stuck work port is fully opened to the pump. By partially opening the unstuck work port valve, it can be observed that the stuck poppet has been freed as the actuator would then be allowed to move and a pressure drop would also be seen across the partially open valve. The system pressure is then ramped up from zero to maximum for a time period, for example 2 seconds. The signal to the stuck work port valve may also be pulsed at step 1316. In one embodiment, the pulses can have a growing amplitude until a time limit or other parameter is reached.

At step 1318, it is ascertained whether the work port is blocked or unblocked as a result of step 1314. If the work port is unstuck, the anti-contamination mode is exited at step 1324. If the work port is still blocked, and where an optional counter has not reached a maximum limit at step 1320, the procedure moves to step 1322 where the commanded stuck work port valve is fully closed and the system pressure is returned to zero. The procedure then loops back to step 1316. The anti-contamination mode is exited at step 1324 when the work port is freed from blockage or when the counter reaches a maximum limit.

At step 1328, which is implemented where condition 1326 exists, the unstuck work port valve is partially opened and the valve associated with the stuck work port is fully opened to the tank. The system pressure is then ramped up from zero to maximum for a time period, for example 2 seconds. The signal to the stuck work port valve may also be pulsed at step 1328. In one embodiment, the pulses can have a growing amplitude until a time limit or other parameter is reached.

At step 1330, it is ascertained whether the work port is blocked or unblocked as a result of step 1328. If the work port is unstuck, the anti-contamination mode is exited at step 1336. If the work port is still blocked, and where an optional counter has not reached a maximum limit at step 1332, the procedure moves to step 1334 where the commanded stuck work port valve is fully closed and the system pressure is returned to zero. The procedure then loops back to step 1328. The anti-contamination mode is exited at step 1324 when the work port is freed from blockage or when the counter reaches a maximum limit.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A method for isolating a fault condition or a blocked work port in an electco-hydraulic system comprising:
   (a) setting a system pump to a first predetermined pressure;
   (b) commanding a valve assembly to a center position;
   (c) recording a center position (xc) of the valve;
   (d) opening the valve assembly to place a work port associated with the valve in fluid communication with the pump;
   (e) recording a first end position (xp) of the valve, a first work port pressure (P1), and a first pump supply pressure (Ps);
   (f) opening the valve assembly to place the work port in fluid communication with a tank reservoir;
   (g) recording a second end position (xt) of the valve and a fluid pressure (Plow) associated with the work port;
   (h) setting the pump to a second predetermined pressure;
   (i) opening the valve assembly to place the work port in fluid communication with the pump;
   (j) measuring a second work port pressure (P2) and a second system pump pressure (Ps2) associated with the pump; and
   (k) analyzing the recorded and measured data to identify the fault condition or blocked work port, including comparing the second work port pressure (P2) to the second system pump pressure (Ps2) and by comparing the recorded first work port pressure (P1) to the second system pump pressure (Ps2).

2. The method for isolating a fault condition or a blocked work port in an electro-hydraulic system of claim 1, further comprising the steps of:
   (a) recording the second work port pressure (P2) and the second system pump pressure (Ps2);
   (b) setting the pump to a third predetermined pressure;
   (c) opening the valve assembly to place the work port in fluid communication with the pump; and
   (d) measuring a third work port pressure (P3) and a third system pump pressure (Ps3) associated with the pump.

3. The method for isolating a fault condition or a blocked work port in an electro-hydraulic system of claim 1, wherein the step of analyzing the recorded and measured data includes:
   (a) comparing the recorded center position (xc), first end position (xp), and second end position (xt) to stored values in a controller.

4. The method for isolating a fault condition or a blocked work port in an electro-hydraulic system of claim 1, wherein the step of analyzing the recorded and measured data includes:
   (a) comparing the first work port pressure (P1) to the first system pump pressure (Ps).

5. The method for isolating a fault condition or a blocked work port in an electro-hydraulic system of claim 2, wherein the step of analyzing the recorded and measured data includes:
   (a) comparing the third work port pressure (P3) to the third system pump pressure (Ps3).

6. The method for isolating a fault condition or a blocked work port in an electro-hydraulic system of claim 5, wherein the step of analyzing the recorded and measured data includes:
   (a) comparing the third work port pressure (P3) to the second system pump pressure (Ps2).

7. A method for isolating a blocked work port in an electro-hydraulic system comprising:
   (a) configuring a first valve and a second valve associated with opposite sides of a actuator to switch between a flow control operational mode and a pressure control operational mode depending upon an operational state of the actuator, wherein only one of the valves is in a pressure control mode and only one of the valves is in a flow control mode at the same time;
   (b) commanding a first valve and a second valve associated with an actuator to move the actuator in a first direction to place the actuator in a passive state or an overrunning state;
   (c) comparing a design flow rate with a calculated flow rate for the valve in the flow control operational mode and comparing a system pressure set point with a measured work port pressure for the valve in the pressure control operational mode to identify and isolate the fault condition or blocked work port.

8. The method for isolating a blocked work port in an electro-hydraulic system of claim 7, further comprising:
 (a) commanding the first valve and the second valve associated with the actuator to move the actuator in a second direction to place the actuator in a passive state or an overrunning state that is different from the actuator state of the first direction;
 (b) comparing a second design flow rate with a second calculated flow rate for the valve in the flow control operational mode and comparing a second system pressure set point with a second measured work port pressure for the valve in the pressure control operational mode.

9. An anti-contamination method for a blocked work port in an electro-hydraulic system comprising the steps of:
 (a) providing a first valve assembly and a second valve assembly associated with opposite sides of an actuator via a first and second work port;
 (b) fully opening a second valve assembly associated with a second side of the actuator to place the second work port in fluid communication with a system pump;
 (c) ramping an output of the system pump up to a maximum output for a period of time;
 (d) pulsing the input to the second valve at a frequency;
 (e) closing the second valve assembly and ramping the output of the pump downward; and
 (f) repeating steps (b), (c), and (d) until the work port associated with the second valve assembly is freed from blockage or until a command is received to stop the procedure.

10. The anti-contamination method for a blocked work port in an electro-hydraulic system of claim 9, further comprising the step of:
 (a) partially opening the first valve assembly.

11. The anti-contamination method for a blocked work port in an electro-hydraulic system of claim 9, wherein the step of pulsing the input to the second valve at a frequency includes pulsing the input to the second valve at a frequency of about 1 hertz.

* * * * *